M. A. YEAKLEY.
INTERNAL COMBUSTION ENGINE.
APPLICATION FILED MAY 17, 1915.

1,335,310.

Patented Mar. 30, 1920.
6 SHEETS—SHEET 5.

Witness
Floyd P. Cornwall.
H. A. Palmer

Inventor
Melvin A. Yeakley
By A. S. Pattison
Attorney

UNITED STATES PATENT OFFICE.

MELVIN A. YEAKLEY, OF CANTON, OHIO.

INTERNAL-COMBUSTION ENGINE.

1,335,310.  Specification of Letters Patent.  Patented Mar. 30, 1920.

Application filed May 17, 1915. Serial No. 28,669.

*To all whom it may concern:*

Be it known that I, MELVIN A. YEAKLEY, a citizen of the United States, residing at Canton, in the county of Stark and State of Ohio, have invented certain new and useful Improvements in Internal-Combustion Engines, of which the following is a specification, reference being had therein to the accompanying drawing.

My invention relates to improvements in internal combustion engines and the like, and belongs to that class of internal combustion engines and the like having a number of piston cylinders arranged in the circle, and parallel with a mounted power-shaft, and a wabbler mounted on said power-shaft having the cylinder pistons operatively connected thereto.

The invention is here shown and described in an internal combustion engine to which it is most particularly adapted, but it is obvious that parts of it are applicable to steam engines, also pumps, and also combined with either engine and pump or pumps.

The primary object of the present improvement is to provide counter-balancing of the reciprocating and wabbling parts that reciprocate parallel to that of the power-shaft, whereby vibration is substantially eliminated and all the parts in motion tend to make a uniform tortion or turning motion, similar to that created by a fly-wheel, and will enable the apparatus to be run at a very high speed, and the use of a fly-wheel may be eliminated when desired.

Another object of the present improvement is to arrange the balancing and counterbalancing of the wabbling holder, whereby the vibration heretofore experienced in engines of this type is eliminated.

Another object of the present improvement is to devise a balanced wabbler whereby the vibration heretofore experienced in engines using a wabbler will be eliminated. A still further object of the present improvement is to so arrange the piston cylinders on both sides of the wabbler that will enable high powered, compact, small air-cooled cylinder explosive engines to be built.

A still further object of the present improvement is to devise an engine of this type which is more compact, more simple, lighter, cheaper and more durable.

With the above and other objects in view, my invention consists in the novel features, novel combinations and arrangements of parts, all substantially as herein shown and described and particularly pointed out in the claims.

For convenience, I have shown and described the device herein, embodying the invention as being used in an automobile engine in which it is most particularly adapted, but I desire it to be understood that it is applicable to an unlimited variety of uses.

In the accompanying drawings.

Figure 1:
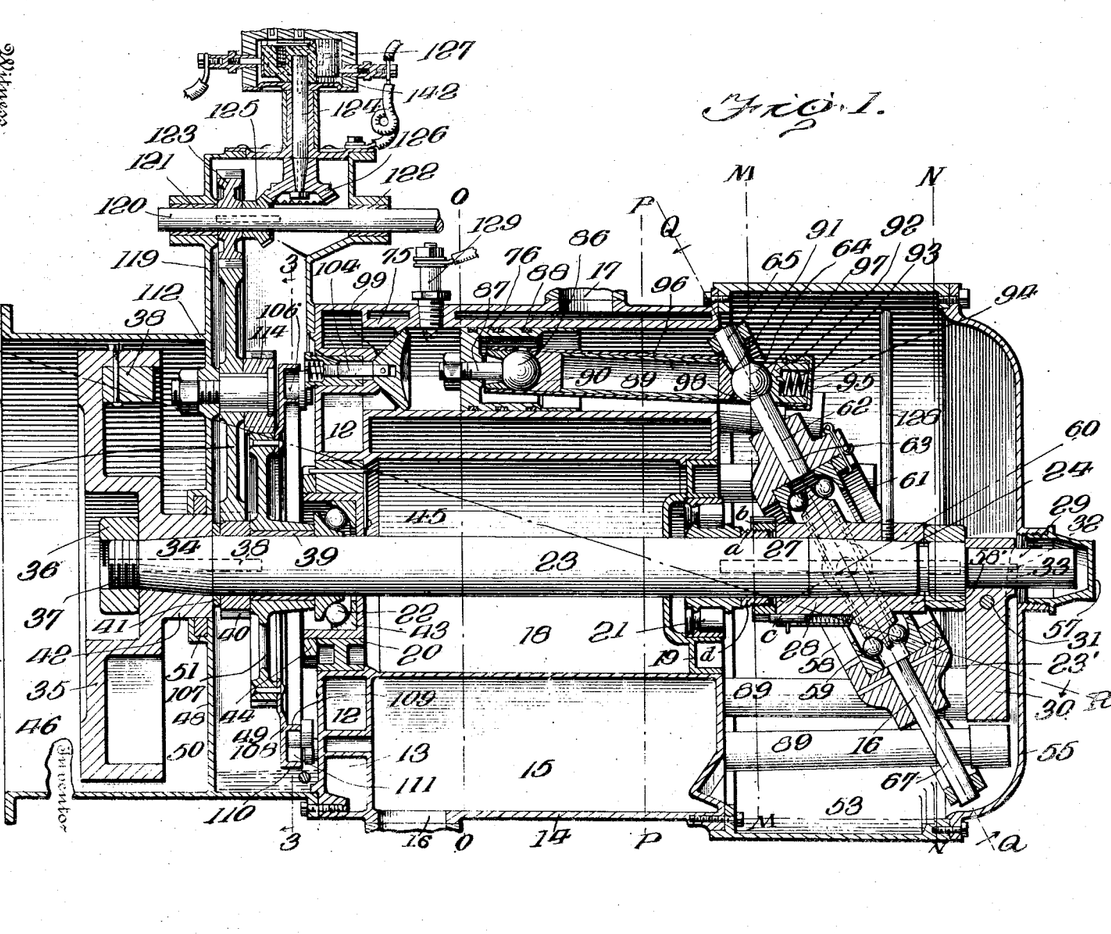
Figure 1 is a vertical, sectional view taken on the dotted line 1—1 of Fig. 2 looking in the direction of the arrow, of my improved eleven cylinder internal combustion engine.
Figure 2:
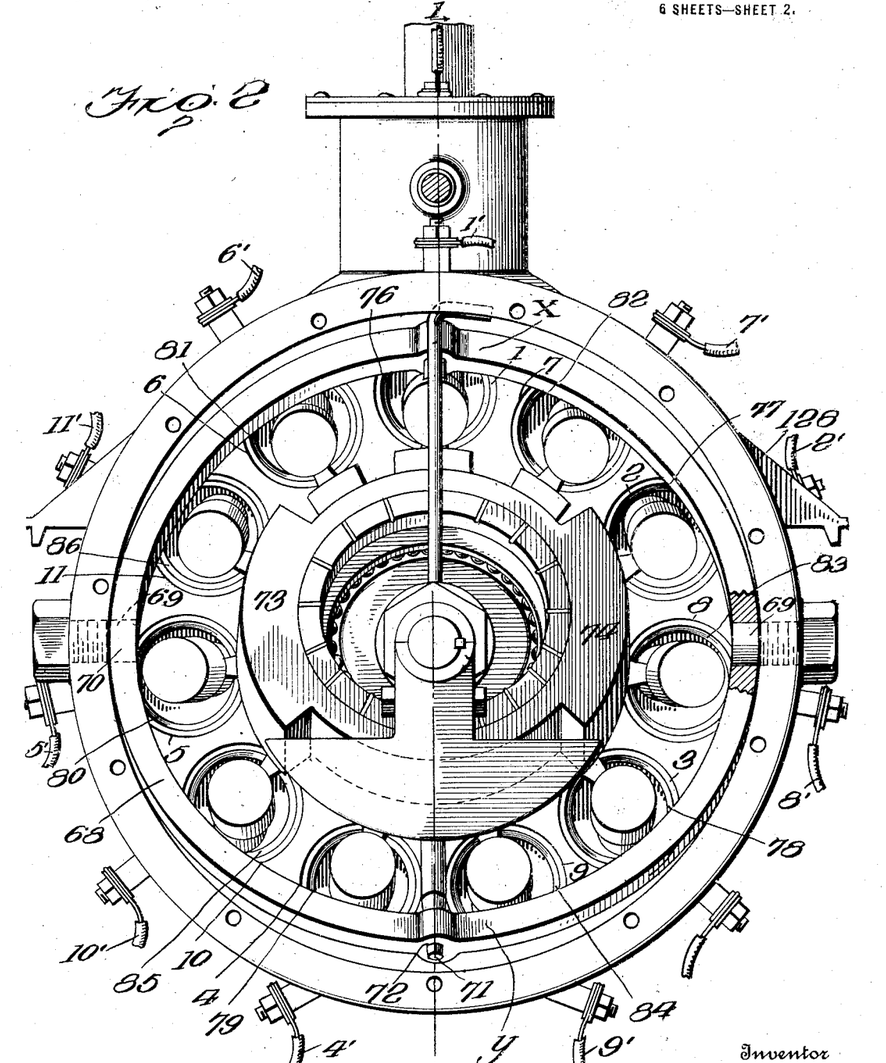
Fig. 2 is a front elevation of the engine, the front part of the casing having been removed.

Referring now to the drawings in detail in which like reference numerals designate similar parts, and referring particularly to Figs. 1 and 2, the reference numerals 1 to 11 indicate the eleven cylinders of the engine. The inlet manifold is indicated by the reference numeral 12 and the exhaust manifold by the numeral 13, both of which are cast in a block 14 which also serves as a part of the frame of the engine. The cylinders 1 to 11 are arranged parallel and horizontal, and surrounding an axis in a circle and spaced an equal distance apart, and are surrounded by a water jacket 15 which has water circulating connections 16 and 17. Centrally of the cylinders is arranged a cylindrical opening 18, from end to end of the block 14, and in each end thereof are placed bearing supports 19 and 20 respectively, and in these supports are supported the respective antifriction combined supporting and end thrust bearings 21 and 22. Mounted in these bearings is a power-shaft 23 adapted to rotate freely therein in the direction shown by the arrow. A wabbling head 23′ is mounted fixedly on the forward and tapered portion 24 of the power-shaft 23, and is held firmly in place by a nut 25 screwed on a threaded portion 26 of the power-shaft, and is held from turning by a spline key 27 shown in dotted lines.

An improved means for locating the wabbler head in respect to the wabbler holder, and holding the bearings in place and taking up the wear of the bearing is provided. This means comprises a threaded collar $a$ on the power shaft and nut $b$ thereon, which forms an adjustment wear take-up between the bearing 21 and the wabbler head 23′. The nut $b$ is held in place by a spring-pressed sliding bolt $c$ locked in any one of the notches $d$ thereof. The collar $a$ is also held from turning on the shaft by the spline key 27.

A bearing cup 43 which holds the bearing 22 in place in the support 20 has a nut 44 screwed on the threaded portion thereof which jams against the support 20 and serves as an endwise adjustment for the power-shaft and bearing wear take-up at this end of the shaft. The nut 44 is locked from turning by a spring-pressed bolt 45 which works in suitable notches formed in the nut 44.

A sleeve 39, gear 40 and fill-in washer 41 surround the power-shaft 23 and form an end thrust support on the hub 42 of the wheel 35, for the cone of the bearing 22.

On the end part 29 of the shaft 23 is fixedly mounted a counter-balanced weight 30 which is held firmly in place by a bolt 31 and is held from turning by a spline key 32 shown in dotted lines.

In the forward portion of the hub of the counter-balance weight 30 are formed catches 33 shown in dotted lines which are constructed to lock in the corresponding catches in a starting crank (not shown).

On the rear portion 34 of the power shaft 23 is fixedly mounted a clutch carrying wheel 35 which is held in place by a nut 36 screwed on a threaded portion 37 of the said shaft and is held from turning by a spline key 38 shown in dotted lines. In the said clutch carrying wheel 35 on the opposite side of the shaft to the counter-balance weight 30 is fixed a counter-balance weight 38′ of a weight to balance the counter-balance weight 30 on the axis of the power-shaft.

A frame or casing 46 is secured to the rear end of the cylinder block 14 to inclose the gearing hereinafter described and the clutch wheel 35. A web 48 forms a separate chamber 49 to keep the lubricating oil in the said chamber from passing into a clutch chamber 50. The said web is provided with a suitable felt packing 51 in the center thereof which engages the hub 42 of the clutch wheel. A flange 52 is provided for securing the clutch casing not shown.

A frame or wabbler casing 53 is secured to the front end of the cylinder block 14. A cover 55 for the said casing is secured thereto. A cap 57 is secured firmly into the cover hub 56 and is adapted to be removed to provide an opening so that a hand crank, not shown, may be placed on the end of the power-shaft 23 for starting the engine when it is so desired.

Referring again to the wabbler head 23′ a wabbler 58 is mounted freely thereon on antifriction bearings 59, arranged at an angle to that of the axis of the power-shaft with the axis thereof indicated by the dash line 60. This axis is at an angle (in this instance of 26 degrees) to that of the axis of the power-shaft 23, and intersects it in the center of the wabbler 58 and wabbler head 23′ so that when the power-shaft is turned, the axis of the wabbler will revolve around and with it which causes the wabbler to wabble while it is being held from turning. In this instance, the bearings 59 are of the usual type of ball bearings arranged in two races on either side of the wabbler 58, and at each side of the center of the wabbler head 23′. Suitable means in the form of a jam collar 61 and coöperative parts for holding the balls and cones of the bearing in place, is provided.

The wabbler is fitted with eleven studs 62 each fixedly mounted in bores 63 spaced equally apart surrounding the axis 60, centrally in the edge thereof (Fig. 2) and pointing toward the center. Each stud 62 has a spherical-shaped bearing knob 64 adjacent its outer end arranged approximately in line with the axis of the cylinder it is to coöperate with. The circular plane of the several knobs 64 will be termed the edge of the wabbler as the studs 62 are fixed in the circular edge of the wabbler 58 proper and becomes a part thereof. Extending outwardly from the knob 64 of the stud 62 that operates in line with the axis of the cylinder 1, is a spindle 65. Opposite to this and in the axis thereof is fixed in the wabbler 58 a stud 66 having on its outer end a bearing spindle 67.

A ring wabbler holder 68 surrounds the exact center of the wabbler 58, and is mounted freely on a pair of studs 69, one fixed in each of their respective side walls of the casing 53 having the axis horizontal and intersecting centrally of the wabbler head 23', at right angles to the power-shaft 23 extending freely through openings 70 made in the ring. At right angles to the studs 69 are bearing spindles 65 and 67 extending freely through openings 72 in the ring 68. The ring 68 permits the wabbler to wabble, but holds it from being turned and reciprocates at each side with the wabbler.

Balance weights 73 and 74 are provided on the wabbler and are arranged at right angles to the spindles 65 and 67 and serve to balance the reciprocating part of the ring 68 and parts connecting the wabbler 58 to produce a wabbling motion on the wabbler axis so that it can be counter-balanced.

The cylinders 1 to 11 are open to the wabbler chamber 53 at the forward end, and closed at the rear end with an integral head 75; and respective pistons 76 to 86 are fitted closely to the said bore so that they will work freely from end to end thereof. The said pistons are packed with the usual piston rings 86'.

Centrally of the respective piston faces is a fixed stud 87, having an integral bearing knob 88 on the end thereof, arranged centrally of the pistons. Mounted on the respective knobs 88 and 64 of the piston and wabbler, is a suitable connecting rod 89.

It will be noted that the connecting rod 89 gives perfect universal connections between the wabbler and pistons connected therewith.

With the foregoing description, it will be noted that when the power-shaft 23 is being revolved, that the wabbler knobs 64 are consecutively reciprocated to and from the line M—M to the line N—N and the faces of the pistons from lines O—O to lines P—P in the consecutive reciprocation following the direction of the turning of the power shaft as seen in Fig. 1.

Figures 4, 5:
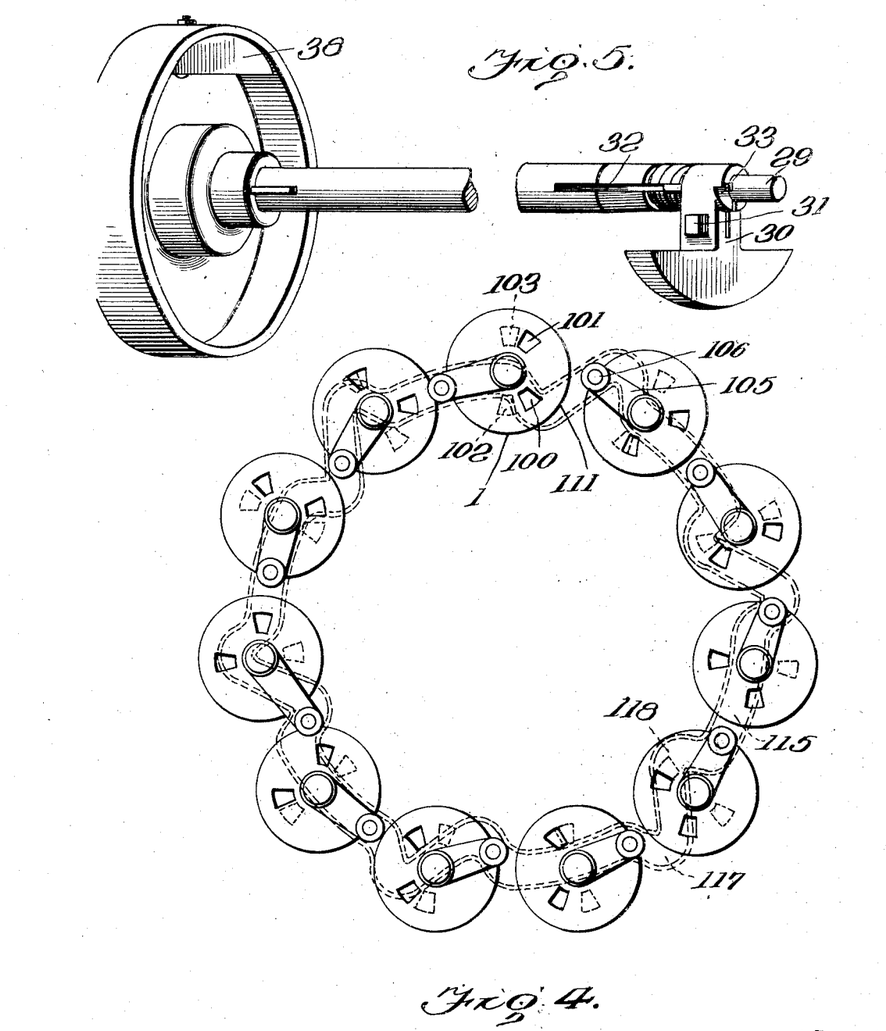
Fig. 4 is a diagrammatic end view taken of the valves and parts of the cylinders showing the relation of the valves with the cam-way and inlet and exhaust manifolds of the cylinders.
Fig. 5 is an enlarged fragmental perspective view showing the arrangement and coöperative positions of the counter-balancing weights.
Figure 6:
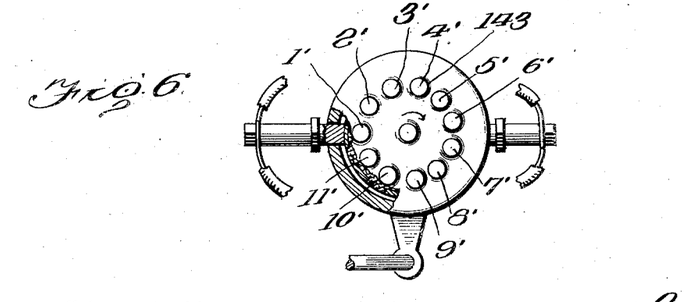
Fig. 6 is a plan view partly in section of the electric distributer and timer.

A description now of the valve mechanism will be taken up, but only specific enough to explain its coöperative relation with the rest of the engine. In the rear and inside of each cylinder, is a rotary cut-off valve 99 having a conical seating face at an angle of 45 degrees, in this instance, from the cylinder axis, and fitted true to a correspondingly shaped cavity seat formed in the cylinder head 75. The valve 99 has inlet and exhaust passages 100 and 101 as is seen in Fig. 4. These passages are arranged so they do not match with the respective inlet and exhaust passages 102 and 103 opening from the cylinders to their respective inlet and exhaust manifolds 12 and 13, shown in the position as seen in Fig. 4 in respect to the cylinder 1. In Fig. 4 the valve passages are shown in full lines, and the cylinder passages are shown in dotted lines. The inlet and exhaust passages 102 and 103 are located centrally on a radial line crossing the cylinder, and the respective inlet and exhaust passages 100 and 101 in the valve are located to one side, and both on the same side a sufficient distance so that there is no communication from the cylinders to the passages 102 and 103 as seen in relation to cylinder 1 in Fig. 4. However, when the valve is turned to open position with either of the said passages of the cylinder, the respective passages of the valve will register therewith. Each of the valves 99 has a rod 104 suitably mounted within the casing of the cylinder and projecting rearwardly and carrying on its ends an arm 105 which in turn, carries a roller 106.

A cam wheel or gear 107 is mounted to rotate freely on the sleeve 39. This cam wheel has fixed thereto a web 108 having flanges 109 and 110 integral therewith spaced an equal distance apart which forms a cam race or way 111 within which the valve crank rollers 106 operate freely as will be hereinafter more fully described.

A stud 112 is fixed to the web 48. Reducing gears 113 and 114 are fixed together and are freely mounted on the said stud and arranged so that the gear 113 meshes with the gear 40 on the power-shaft 23, and is driven thereby, and the gear 114 meshes with the cam gear 108 and drives it.

Through the reducing gears thus described, the cam gear 108 is driven at one twelfth the speed of the power-shaft 23 and in the same direction. In other words, the power-shaft 23 makes twelve revolutions to one of the cam wheel in the same direction.

It is to be understood that the engine herein described is one of the so-called four cycle type, that is, the piston makes four strokes in the cylinder to each working cycle, and requires two revolutions of the power-shaft, as is well known to those skilled in the art. To this end, the cylinders are arranged in a circle in odd numbers, in this instance the number being eleven, so that each can deliver a work stroke alternately, and at uniform intervals, as the power-shaft is turned any number of revolutions. Therefore, the cylinders are numbered alternately in the order they are fired, and the work stroke takes place, as seen in Figs. 2 and 4.

Figure 3:
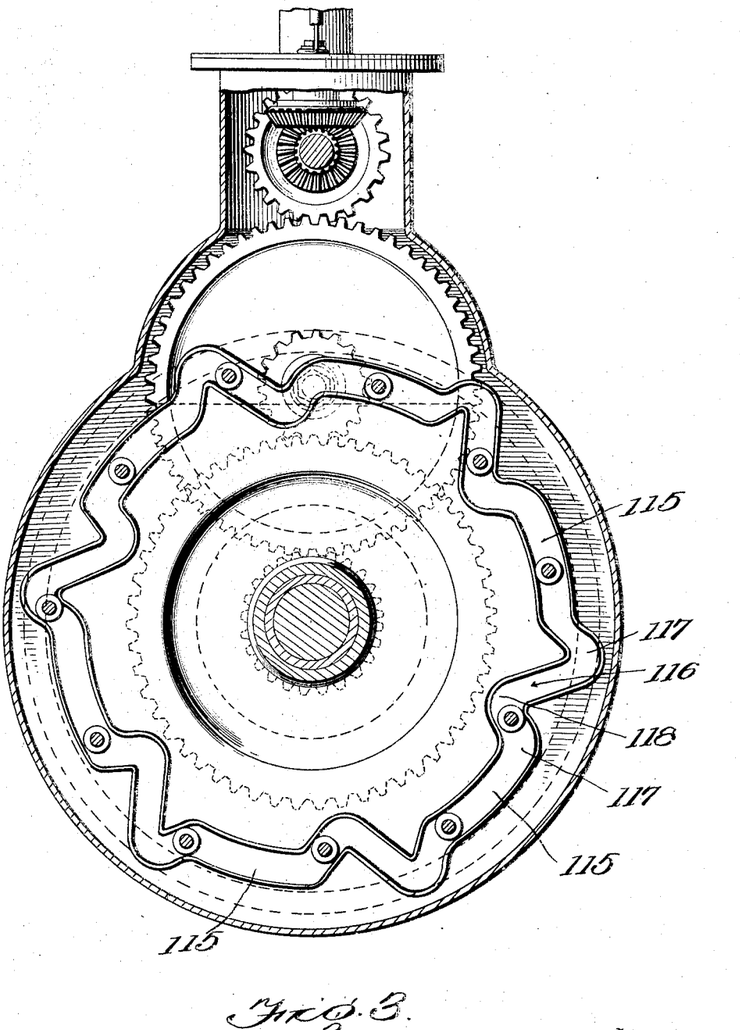
Fig. 3 is a sectional view taken on the line 3—3 of Fig. 1 looking in the direction indicated by the arrow, and showing the arrangement of the timing gears for the ignition mechanism and also the cam actuating means for the valves.

Referring again to the cam race or ways 111 seen in Figs. 3 and 4, it is endless and arranged in an irregular circular form, surrounding the power-shaft, and is imaginarily divided into twelve acting sections, six of which are alternate true radial arcs 115 of the race 111 and the other six portions 116 are S-shaped, comprising cams 117 and 118 for opening the valves 99 to register with the respective inlet and exhaust passages 102 and 103 of the cylinder, and closing it again and are arranged and positively geared so that while the true arc portion passes the roller 106, the valves continue to remain at rest and closed, and the compression and work strokes are made by the piston co-acting therewith, the power-shaft turns one revolution, and while the S-shaped portion comprising the cams 117 and 118 following, passes the roller, the valves are opened to the exhaust passages and closed again by the inner curved cam 118 during the exhaust stroke of the piston; and then opened to the intake and closed again by the outer curved cam portion 117, during the suction stroke of the piston.

The number of cylinders having valve crank rollers 106 being eleven, and the number of acting sections in the cam race 111 being twelve, this causes a differential match of the roller and acting space as seen in Figs. 3 and 4, so that the acting spaces are in proper position at all times with the rollers 106 and race 111, in accordance with the co-acting pistons, wabbler and power-shaft.

It will be understood that the difference in number of one of the acting spaces in the cam race to that of any number of cylinders, causes the proper location of all the acting spaces in respect to the co-acting valve operating members.

It will also be noted that the valves 99 are moved by the cams 117 and 118 to open and close the passages 102 and 103 when there is but very little or no pressure on them, which saves power and prevents the cutting of their seats. The inlet manifold or passage 12 is connected with any one of the well known carbureters (not shown). The exhaust manifolds or passages 13 may lead to the atmosphere in any suitable manner (not shown).

The description of the ignition mechanism will now be taken up, but will only be described specifically enough to show its co-operation with the rest of the engine.

A gear housing 119 is integral with the casing 46. An auxiliary shaft 120 is mounted to rotate freely in bearings 121 and 122 formed in the said housing. A gear 123 is fixed on the auxiliary shaft 120 and meshes with the large reducing gear 113 and thereby rotates the auxiliary shaft at the same speed as that of the power-shaft 11. Gears 125 and 126 carried respectively by the shafts 120 and 124 and meshing with each other to transmit rotary motion of the right speed to an electric timing and distributing apparatus 127 which revolves the drum 142 half a revolution to one revolution of the power-shaft. It will be understood that any of the jump spark electric igniting systems is applicable to this engine when distributed and timed right to the several cylinders. The timing and distributing mechanism 127 having a drum 142 is geared to revolve positively one revolution to two revolutions of the power-shaft. This is accomplished by means of the gear 126 fixed to revolve with the drum 142 meshing with the gear 125 fixed on the auxiliary shaft 120. This turns the timing and distributing drum 142 so that the circuit connections 143 which are eleven in number, represented by numerals 1' to 11' correspond with the eleven cylinders, numbered 1 to 11, in the firing order described. The revolution of the timing drum 142 closes the jump spark electric circuits and breaks them again at the proper ignition time, which is approximately at the completion of the compression stroke in the cylinders in their consecutive firing order which as heretofore described is thus; cylinders, 1, 2, 3, 4, 5, 6, 7, 8, 9, 10, 11 and 1, 2, 3, etc.

As has been heretofore stated, no further specific description of the ignition mechanism will be herein set forth.

Engine supports 128 may be integral or fixed at any suitable place on the cylinder block 14, or on each of the end casings 46 and 53.

The operation of the engine is as follows:

Assume that the engine is running as illustrated in Figs. 1, 2, 3, and 4, the power-shaft being turned in the direction of the arrow. In cylinder 1, the valve 99 is in closed position, and the roller 106 is in the arc space 115 of the race, and the explosive charge within the cylinder is compressed by the piston 76 and the piston has completed its compression stroke. At this time circuit 1' is closed through the operation of the timer and distributer 142 and the compressed charge is ignited by spark plug 129. The piston 76 is delivering no power to the wabbler head 23' as yet, as it is on what may be termed "dead center," when the axis of the cylinder, power-shaft, and wabbler head are in the same radial plane as is seen in the line of vertical section of Fig. 1. Piston 82 is near the completion of the exhaust stroke in the cylinder 7, and the valve passage 101 is open to exhaust passage 103 and the roller 106 is in the cam portion 118 of the cam race 111. The piston 77 is in the latter portion of the compression stroke in the cylinder 2, and the valve 99 is in the closed position, and the roller 106 is in the arc space 115 of the cam race. The piston 83 is near the middle of the exhaust stroke and the valve passage 101, and fully registers with the exhaust passage 103, and the roller 106 is in the cam portion 118 of the race, and the parts are in the position as is illustrated in Fig. 4. The piston 78 is in the early portion of the compression stroke in the cylinder 3, and the valve 99 is in closed position, and the roller 106 is in the arc space 115 of the race. The piston 84 is in the early portion of the exhaust stroke in the cylinder 9, and the valve passage 101 is open partly to the exhaust passage 103 and the roller 106 is in one of the cam spaces of the race 108. The piston 79 is near the completion of the suction stroke in the cylinder 4, and the valve passage 100 is just being closed off from the inlet passage 102, and the roller 106 is in one of the cam spaces 117 of the race. The piston 85 is near the end of the work stroke in the cylinder 10, and the valve 99 is in closed position, and the roller 106 is in one of the arc ways 115 of the race. The piston in this cylinder is delivering power to the power-shaft. The piston 80 is past midway of the suction stroke in the cylinder 5, and the valve passage 100 registers with the inlet passage 102, and the roller 106 is in the cam portion 117 of the race. The piston 86 is near midway of the work stroke in the cylinder 11, and is delivering power to the power-shaft. The valve 99 is in closed position, and the roller 106 is in one of the true arc portions 115 of the race. The piston 81 is in the early part of the suction stroke in the cylinder 6, and the valve passage 100 is opened a trifle to the inlet passage 102, and the roller 106 is in the cam portion 117 of the race.

It may be stated that the power of the exploded expanding gases in cylinders 10 and 11 is being transmitted to the power-shaft by the pressure thereof in the cylinders exerting on the pistons therein and driving them forward, the power thereof is delivered to the wabbler through the connecting rods horizontally on one side edge and between the dead centers of the wabbler head, while the axis of the wabbler is at an angle to that of the plane of the piston thrusts and power-shaft, thence from the wabbler to the wabbler head, through the horizontal moving inclination portion of the non-rotary bearing ways of the wabbler, acting on the rotary inclined portions of the bearing ways of the wabbler head, in the direction of the arrows, and rotating it thereby thus driving the power-shaft.

Having thus described the action of the eleven cylinders and coöperating parts, it is seen that as the power-shaft turns, that each cylinder and coöperating parts will continuously act accordingly in their proper order and deliver an average of five and one-half work strokes at continual uniform intervals per revolution of the power-shaft, and that the cylinders are fired alternately in the order, thus cylinder 1, 2, 3, 4, 5, 6, 7, 8, 9, 10, 11; 1, 2, 3, etc., until the engine is stopped.

Figure 10:
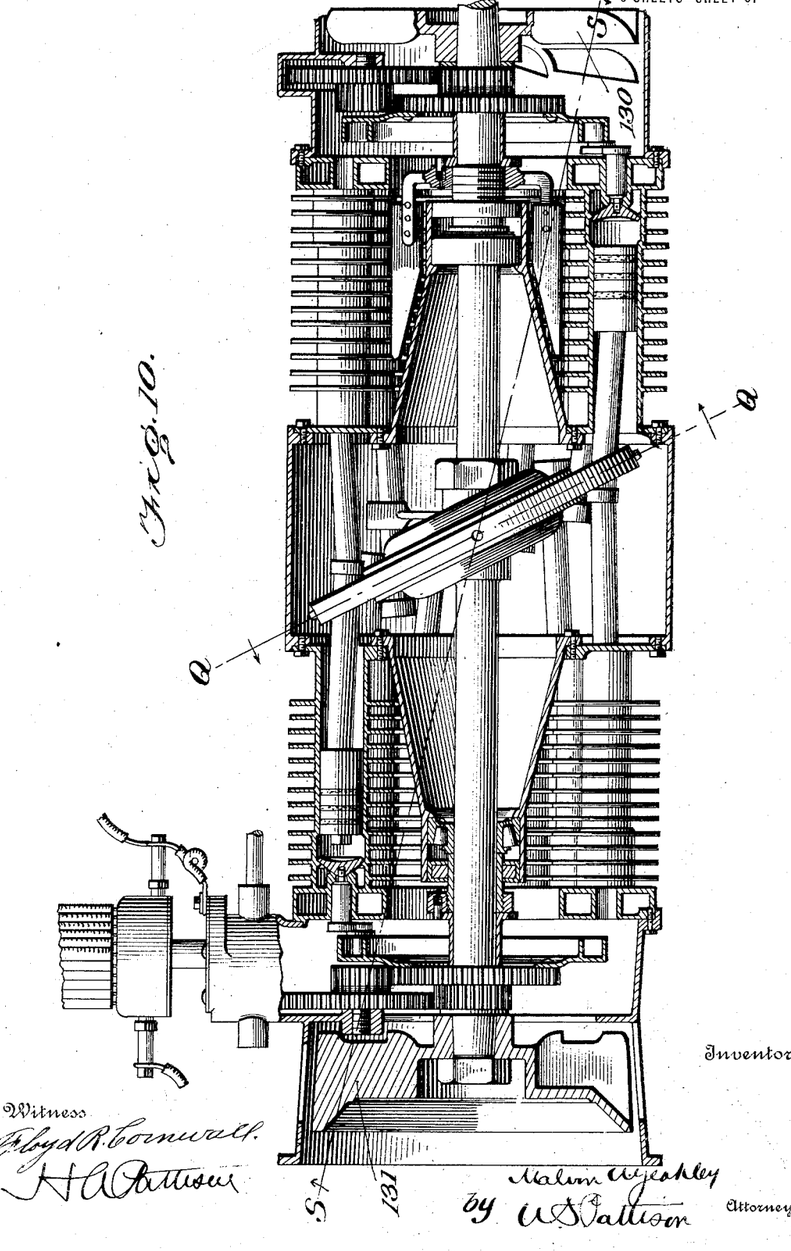
Fig. 10 is a sectional view showing a modification of the engine having twenty-two cylinders of which eleven are arranged on each side of the wabbler.

Were it not for the counter-balance weights 38 and 30, and the balancing weights 73 and 74, when the engine is running, the entire engine would wabble and vibrate very objectionably. The construction and arranging of the counterbalances and weights herein set forth, substantially overcomes these objections. Thus, the reciprocating motion of the portions X and Y of the ring wabbler holder 68 that reciprocates, is balanced by the balance weights 73 and 74 in the wabbler 58, so that the reciprocating motion of all the parts is true during the entire revolution of the power-shaft 23. The horizontal reciprocating motion of the pistons 76 to 86 rods 89, and wabbler 58, and wabbler holder ring 68, causes a cross strain or force on the power-shaft 23 which revolves therewith and follows the dead center of the wabbler head 58' on imaginary cross force line Q—Q and acts in the direction of the arrows. To counteract this cross force on the power-shaft 23, counter-balances 30 and 38 are provided and arranged on imaginary cross force line R—R, and fixed to the power-shaft 23 and to balance each other on each side of the axis of the power-shaft or on the imaginary line, and of a weight that will just cause the cross force on the power-shaft 23 in the direction of the arrows on the imaginary cross force line, and opposite to that of the wabbler 58 and co-acting parts, and to counteract that of the wabbler 58 and connected reciprocating parts, while the engine is running. The modification as illustrated in Fig. 10 sets forth the invention more fully in an air cooled internal combustion engine. This construction shows cylinders arranged on both front and rear sides of the wabbler, which permits a large number of small diameter and long cylinders to be used with high compression, and cooled properly owing to the small diameters thereof, which enables the building of a high powered, efficient, compact, light and cheap air cooled engine large enough to drive large automobiles, trucks, aeroplanes, etc.

The engine illustrated in Fig. 10 will not be specifically described, for the reason that it is identical with the engine shown in Fig. 1 except that the cylinders are duplicated and there are two sets of valves and cam races arranged at opposite ends of the engine, which revolve in the same direction and the cam race acting spaces match each other at all times as they revolve.

The counter-balancing of the wabbler and connecting reciprocating parts therewith, is the same as that of Fig. 1 except that two counter-balances 130 and 131 are an equal distance from the wabbler and power-shaft, are of the same weight and their imaginary cross force line S—S intersects the axis of the power-shaft centrally of the wabbler, which also is the intersecting place of the imaginary cross force line Q—Q of the wabbler and connected reciprocating parts.

Figure 8:
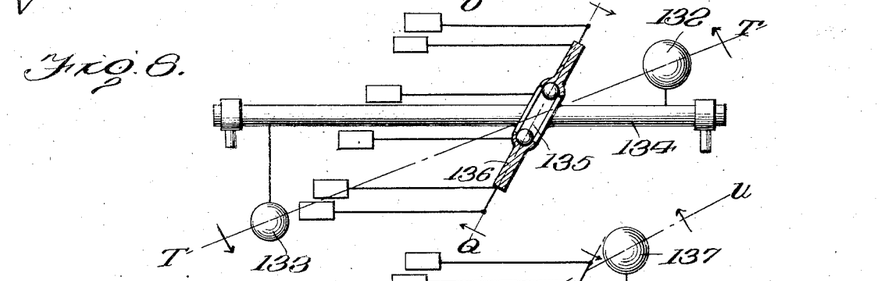

The diagram as shown in Fig. 8 shows a modified arranging of the counter-balances 132 and 133. Assume that the power-shaft 134 is turning in the direction of the arrows. The counter-balance 132 is heavier than counter-balance 133, and is connected so as to revolve nearer the center than the other, so that each one will balance the other on their opposite sides of the power-shaft; also each is located to revolve about the power-shaft in a plane a determined distance apart, and also are arranged on a revolving imaginary cross force line T—T, which intersects the power-shaft 134 centrally of the axis of a wabbler head 135, and also at the same place as that of the revolving imaginary cross force line Q—Q of the wabbler 136. The reciprocating motion of the wabbler 136 and connected parts, throw a revolving cross force on the power-shaft 134 in the direction of the arrows on the cross force line Q—Q; and the counter-balances, 132 and 133 are weighted and so arranged that the centrifugal force thereof throws an equal revolving cross force on the power-shaft on the imaginary line T—T in the direction of the arrows, and in the opposite direction to that of the imaginary cross force line Q—Q; which causes the parts to operate without undue vibration, and all the parts in motion tend to carry the power-shaft motion true, similar to that of the use of a fly wheel, and serves the same purpose to the extent of the motion of the weight of the parts thereof.

Figure 9:
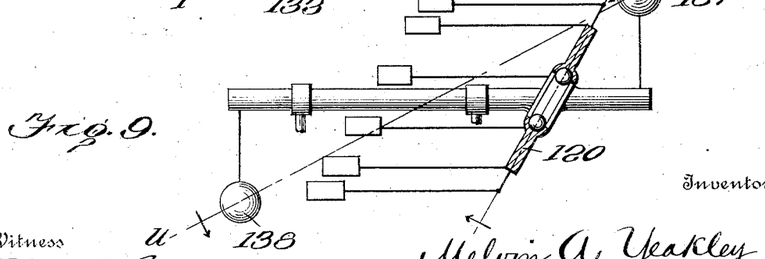

Referring now to the diagram, shown in Fig. 9, it is the same as that shown in the modification in Fig. 8 except that counter-balance weights 137 and 138 are of the same size and arranged so that their revolving imaginary cross force line U—U intersect the axis of the power-shaft at a different point to that of the wabbler 120. The revolving counter-balance cross-force line may intersect the axis of the power-shaft at any place and counter-balance that of the wabbler.

Figure 7:
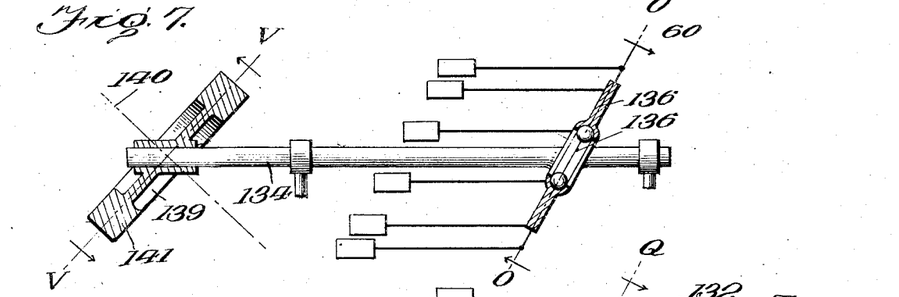
Figs. 7, 8 and 9 are diagrams showing modified forms of balancing and counter-balancing the reciprocating parts and the cross forces on the power-shaft of the wabler and revolving counter-balance of the engine.

Referring now to the modification shown in Fig. 7, the cross force counter-balance comprises a fly wheel 139 fixed to the power-shaft 134 so that the axis 140 of the rim 141 thereof is arranged at an angle similar to that of the wabbler head 135, and wabbler 136 which is also fixed on the power-shaft 134, and arranged on the axis 60 in the same radial plane thereof, so that the cross force of the centrifugal motion of the portions 141' and 141'' of the wabbler rim on the cross force line V—V in the direction of the arrows, is opposite to that on the cross force line Q—Q in the direction of the arrows on the wabbler 136 and connected parts, and of a weight sufficient to counter-balance the same.

It is obvious that any suitable number of cylinders and coöperating parts can be arranged in the cylinder circle or circles or circular plane surrounding the power-shaft, if desired in the construction of such an engine pump or the like. It is also obvious that any portion of the cylinders can be constructed into a pump by changing the valves and passages thereof into the ordinary self acting pump suction and discharge passages.

It is evident in most counter-balance constructions, (for instance as seen in a locomotive driving wheel,) that the part to be counter-balanced is partly counter-balanced by a portion of the necessary construction serving other functions, and the added inertia mass fixed therewith to fully counter-balance the portion to be counter-balanced, is a counter-balance weight, proper, as it serves no other function, therefore it shall be understood herein that where the terms "counter-balance" or "counter balance weight" are used, it means the added inertia mass that is not necessary for any other purpose and only for counter-balancing the intended portions.

For convenience, I have specifically described the mechanism illustrated in the drawings, but it will be understood that a mechanism may be considerably varied in form and be within the scope of the invention.

The drawings and specification are but one expression of the inventive idea set forth in the appended claims.

So far as I am aware, I am the first to counterbalance a rotary cross force in a direction across a wabbler power-shaft by an opposed rotary counterbalancing element or elements fixed to said power-shaft to overcome said revolving cross force and to make a smooth running mechanism of the character herein disclosed.

Having thus fully described my invention what I claim and desire to secure by Letters Patent is:

1. In a mechanism of the character described, a power shaft, a revolving wabbler head attached thereto, a single non-revolving wabbler actuated by the wabbler head and having pistons operatively connected to said wabbler, causing a cross-strain on the shaft in the direction of the tilting of the wabbler head when running, revolving balancing means connected with the power shaft and causing a cross-strain on the shaft in a direction opposite to the cross-strain caused by the non-revolving wabbler, whereby the cross-strain of the balancing means oppose and balance the cross strain of the non-revolving wabbler and pistons.

2. In a mechanism of the character described, a power shaft, a single wabbler head attached to and revolving therewith, a single non-revolving wabbler actuated by the wabbler head, pistons operatively connected with the non-revolving wabbler, whereby a cross-force on the power shaft is produced in the direction of the tilting of the wabbler head, balancing elements fixed to and revolving with the power shaft and located at opposite sides of the said shaft so that a cross-strain line through the balancing elements extends in the same general direction across the shaft as the tilting angle of the wabbler head, whereby the revolving balancing elements cause a cross-strain in a direction toward the tilting of the wabbler head and opposite said cross-strain of the non-revolving wabbler and connected parts and thereby balancing them.

3. In a mechanism of the character described, a power shaft, a single revolving wabbler head attached to the shaft, a non-revolving wabbler actuated by the wabbler-head, pistons operatively connected with the non-revolving wabbler, and balancing elements fixed to and revolving with the power shaft and arranged at opposite sides thereof to cause a cross-strain on a line through the balancing elements extending in the same general direction as the angle of the wabbler head, whereby the cross-strain of the balancing elements is opposite to and balance the cross-strain of the non-revolving wabbler.

4. In a mechanism of the character described, a power shaft having a wabbler head fixed thereto and revolving therewith, a non-revolving wabbler actuated by the wabbler head, balancing elements arranged at opposite sides of the wabbler head, and on opposite sides of the shaft and fixed thereto to cause an increased leverage cross-strain on a line through the balancing elements extending in the same general direction as the angle of the wabbler head, whereby the increased leverage cross-strain of the balancing elements is opposite to and balance the cross-strain of the non-revolving wabbler when running.

5. In a mechanism of the character described, a power shaft, a wabbler head fixed to and revolving with the shaft, a non-revolving wabbler actuated by the wabbler head, pistons operatively connected with the non-revolving wabbler, balancing elements arranged at opposite sides of and revolving with the power shaft and producing a cross-strain, the cross-strain line of the balancing elements extending in a direction opposite to the tilting direction of the axes of the wabbler head and non-revolving wabbler whereby the cross-strain of the balancing elements is opposite to and balances the cross-strain of the non-revolving wabbler when running.

6. In mechanism of the class described, a series of parallel cylinders supported in a circular plane, a power-shaft mounted to rotate freely within said circular plane, a bearing way on said power-shaft having the axis thereof at an angle to that of the power-shaft, a wabbler freely mounted on said angular bearing way, a wabbler holder operatively connecting said wabbler and cylinder support, wabbler holder balancing weights one on each side edge and on said wabbler, a piston in each of said cylinders having operative connections to said wabbler, counter-balancing elements fixed on said power-shaft adapted to counter-balance said pistons and connected reciprocative parts, substantially as described.

7. In mechanism of the class described, the combination of a mounted power-shaft, a wabbler head on said power-shaft, a wabbler mounted on said wabbler head, a supported wabbler holder operatively connected to said wabbler, balancing weights with said wabbler, a series of supported pistons operatively connected to said wabbler edge, wabbler counter-balancing means fixed on said power-shaft, substantially as described.

8. In mechanism of the class described, the combination of a mounted power-shaft, a wabbler head on said power-shaft, a wabbler mounted freely on said wabbler head, a supported wabbler holder operatively connected to said wabbler, balancing weights in said wabbler, a series of supported pistons operatively connected to said wabbler, a pair of counter-balance weights arranged a determined distance apart and one each side of and fixed on said power-shaft, substantially as described.

9. In mechanism of the class described, a series of parallel cylinders supported in a circular plane, a power-shaft mounted to rotate freely within said circular plane, an angular bearing way on said power-shaft having the axis thereof at an angel to that of said power-shaft, a wabbler mounted freely on said angular bearing way, a wabbler holder operatively connected to said wabbler and cylinder support, wabbler holder balancing weights one fixed to each side edge on said wabbler, pistons in said cylinders each having operative connections to said wabbler, a pair of counter-balance weights arranged a determined distance apart and one on each opposite side of and fixed on said power-shaft adapted to counter-balance the reciprocative parts, substantially as described.

10. In mechanism of the class described, the combination of a supported power-shaft having a wabbler mounted thereon; a wabbler holder pivotally connected to said wabbler and support, balancing means adapted to balance the reciprocative part of said wabbler holder and pivots, whereby a true uniform revolving cross strain is produced on the power shaft when revolving and adapted to be counterbalanced by an opposed revolving cross strain on the power shaft for the purpose specified.

11. In mechanism of the class described, a mounted wabbler, a supported wabbler holder operatively connected with said wabbler, balancing weight distributed with the wabbler adapted to balance the reciprocatory portion of the wabbler holder and connections, reciprocatory elements connecting said wabbler, whereby a true uniform revolving axial cross strain is produced when in motion, and adapted to be counter-balanced by an equal opposed true revolving axial cross strain, for the purpose specified.

12. In mechanism of the class described, a rotatably mounted power shaft, a wabbler mounted wabbly on said power shaft, a series of supported reciprocatory pistons surrounding said power shaft having connections to said wabbler, said reciprocatory and wabbling parts adapted to cause a revolving cross strain on said power shaft when turning, a pair of counter-balance weights one fixed on each side of said power shaft in different revolving planes and on each side of said wabbler and of necessary predetermined size and arranged to generate a cross strain on said power shaft when turning equal and opposite to said first mentioned cross strain, whereby it is counter-balanced.

13. In mechanism of the class described, a mounted power shaft having a wabbler bearing thereon with the axis tilted at an angle to that of the power shaft, a wabbler freely mounted on said wabbler bearing, supported cylinders surrounding said power shaft, pistons in said cylinders operatively connecting said wabbler, whereby a wabbling cross force is created on said power shaft, by said wabbler and connected reciprocatory parts in the direction of the tilting of the axis of said wabbler bearing when running, a pair of counter-balancing inertia masses of predetermined size fixed to said power shaft and arranged one on each side thereof and in different revolving planes and arranged so that a cross force line that passes at an angle through both masses is in the same lengthwise plane as said wabbler bearing axis and at an opposite angle thereto and intersecting said power shaft, whereby an opposing cross force is produced across on said power shaft opposite to the tilting of said wabbler axis when running, the weight of the masses being such that the cross force set up is equal and opposite to the cross force caused by the wabbler and connected reciprocatory parts, whereby the cross force caused by the wabbler and connected reciprocatory parts are counter-balanced.

In testimony whereof I hereunto affix my signature in the presence of two witnesses.

MELVIN A. YEAKLEY.

Witnesses:
H. A. PATTISON,
J. K. MOORE.